Patented Sept. 13, 1932

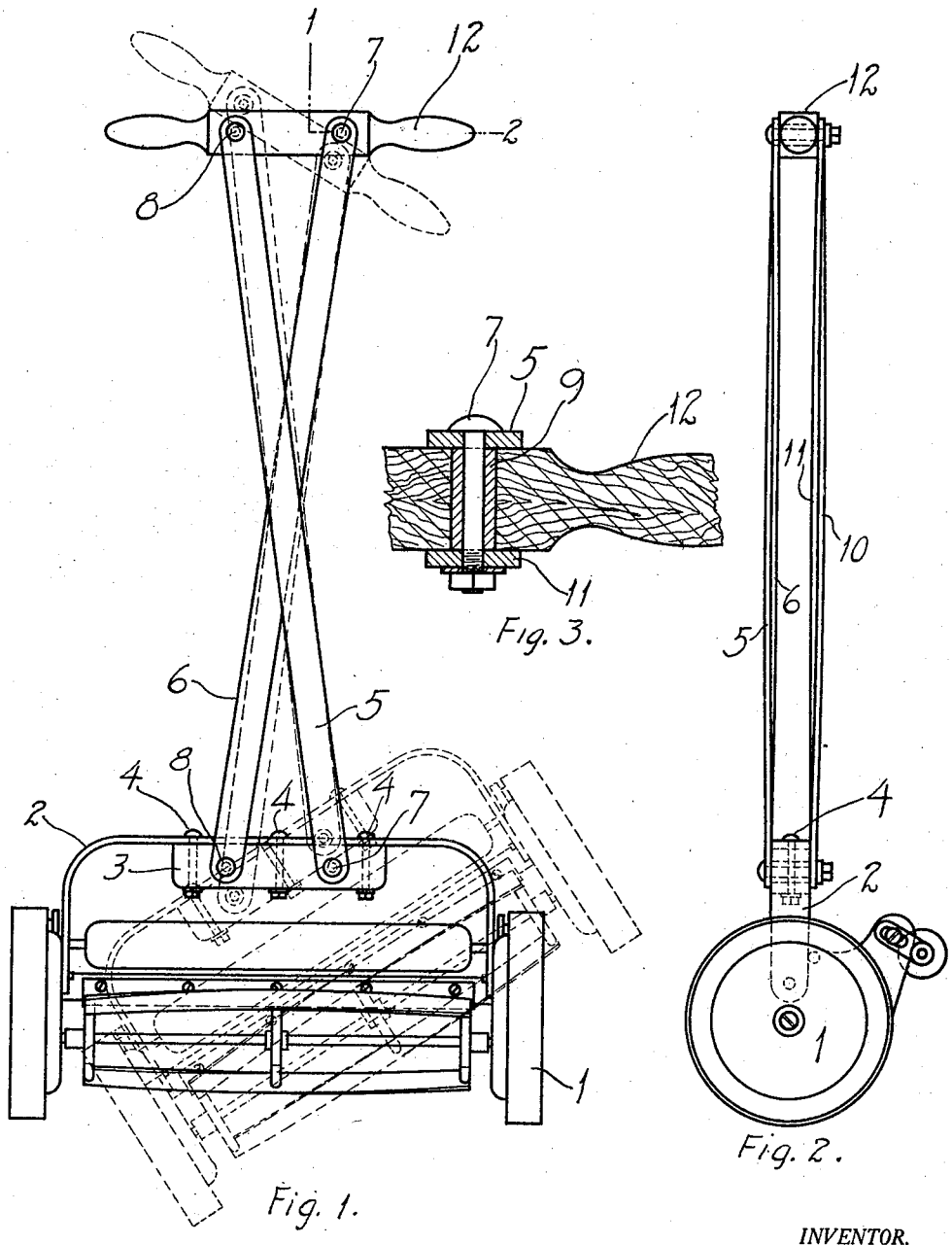

1,876,963

UNITED STATES PATENT OFFICE

CARL C. KLASS, OF OTTAWA, ILLINOIS

LAWN MOWER

Application filed May 7, 1930. Serial No. 450,471.

My invention relates to lawn mowers of the hand push variety and has for its object the production of a steering means whereby the lawn mower is readily continuously positioned and controlled by means of the handle held in the hands of the operator, without employing any mechanical or other locking means.

A further object of my invention is the production of an extremely simple and inexpensive steering means that will enable the operator to pass around the shrubs, flowers, trees and other objects in the lawn he is cutting whether the sides are straight or curved and he can steer the mower to accomplish this without changing his direction of motion. He can also have the mower cut the sides of terraces while he is walking on the level at the foot of the terrace.

I accomplish these objects by the means shown in the accompanying drawing in which:

Fig. 1 is a top view of a mower having my steering means.

Fig. 2 is a side view of same.

Fig. 3 is a partial sectional view of the fastening means on the handle along a line 1—2.

The same numerals represent similar parts throughout the several views.

In the preferred embodiment of my invention shown in the drawing 1 represents the mower which has the handle attaching means or bail, 2 attached to it. 2 has a block member 3 fastened to it by means of the bolts 4 shown. Block member 3 has pivotally connected with it the link members 5 and 6, by means of bolts 7 and 8 in the apertures shown, each of which apertures retains a suitable bushing 9 in said block members 3 same as is shown (see Fig. 3) to prevent wear in the block aperture and to enable same to be replaced when it is worn in order to keep the parts from becoming too loose. The bushing 9 further serves to keep the proper tension or resistance on the two sets of link members one set of which is 5 and 6 and the other set is 10 and 11.

The link members are so arranged and mounted that in each set of two the one set above and the one set below the links in each set across each other as shown in Figure 1. The other ends of the said links are similarly pivotally connected to the handle or handle grip 12 as shown by means of similar bushings 9 and bolts 7 and 8 mounted in said handle.

It is evident from the link connections between the block member 3 and the handle 12 that any angular position that the handle 12 is set into will cause the block member 3 and the mower to take a corresponding position as is shown in the position of the handle 12 and block member 3 in the dotted lines in Figure 1, thus enabling the operator to cut around flower beds, trees, shrubbery etc., lying in his path without stopping or changing from his regular straight path in cutting the remainder of the lawn. The mower is continuously under the control of the handle in the operator's hands without the intervention of any locking devices.

It is further evident that my steering means can be used on mowers having power driving means both for operating the cutters as well as for moving the mower itself and that it can also be used on rollers and other garden tools. Should it be found desirable to use the mower for any length of time in one angular position, it can be so retained by holding the links together where they cross each other by any of the usual locking means such for instance of having apertures in each of the links which register with each other and using a bolt in said apertures.

It will be understood of course, that while I have here shown one form of my invention, I do not wish to limit myself to the exact form shown, but desire to have it taken in a sense illustrative of any or all the forms of same that will come fairly within the scope of the appended claims.

I claim:

1. In a lawn mower, steering means comprising a handle attaching member associated with said mower, a handle grip, a plurality of crossed links extending rearwardly of the mower, the forward end of each link being pivotally connected to said handle attaching member, and the other ends of said links being pivotally connected to said handle grip.

2. In a lawn mower, steering means comprising a handle attaching member associated with said mower, a handle grip, and a plurality of pairs of crossed links extending rearwardly of the mower, said pairs of crossed links being pivotally connected at their opposite ends to said handle attaching member and handle grip respectively, one of said pairs being in superposed relation to the other.

3. In a lawn mower, steering means comprising a handle attaching member associated with said mower, a handle grip, and a plurality of pairs of crossed links extending rearwardly of the mower, said pairs of crossed links being pivotally connected at their opposite ends to said handle attaching member and handle grip respectively on opposite sides thereof.

4. In a lawn mower, the combination of a handle attaching member, a block member carried thereby, a handle grip, and a plurality of crossed link members extending rearwardly of the mower intermediate said handle grip and block member pivotally connected thereto and constituting steering means for said mower incident to manipulation of said handle grip.

5. In a lawn mower, the combination of a handle attaching member, a block member carried thereby, a handle grip, and a plurality of pairs of crossed link members extending rearwardly of the mower intermediate said hande grip and block member, pivotally connected thereto in vertically spaced relation and constituting steering means for said lawn mower incident to manipulation of said handle grip.

CARL C. KLASS.